3,322,724
RECOVERY PROCESS FOR POLYCARBONATES
Hermann Schnell, Krefeld-Urdingen and Hans Helmut Schwarz, Krefeld-Bockum, Germany, and Alois M. Gemassmer, Pittsburgh, Pa., assignors to Farbenfabriken Bayer Aktiengesellschaft, Leverkusen, Germany, a corporation of Germany
No Drawing. Filed July 25, 1963, Ser. No. 297,690
Claims priority, application Germany, Aug. 18, 1962, F 37,625
5 Claims. (Cl. 260—47)

The present invention relates to polycarbonates and more specifically to a method for the production of solid polycarbonates from a dilute solution thereof.

The production of high molecular weight, linear thermoplastic polyesters of carbonic acid is known, for example, by the methods disclosed in U.S. Patent 3,028,365 and U.S. patent applications Ser. Nos. 572,802 (now U.S. Patent No. 3,136,741), and 572,793 (now U.S. Patent No. 3,271,367). The resulting product made via these procedures is usually a solution made up of the polyester or polycarbonate in an inert organic solvent.

Various methods of removing the solid polycarbonate from solution are also known, such as, for example, crystallization, evaporation and gelling procedures. An especially advantageous process as disclosed in U.S. patent application Ser. No. 820,854 (now U.S. Patent No. 3,112,292) involves the adjustment of concentration of a polycarbonate solution in such a manner that the solution upon standing will gel into a solid crumbly mass. This mass can be easily broken up into a granulate which is subsequently freed from solvent and dried. Thus, there is directly obtained in a simple manner, a granulate of high bulk density such as is required for usual thermoplastic molding processes. A second process involves direct evaporation of the solvent by heating to a temperature above the boiling point of the solvent, thereby volatilizing off the solvent, leaving the solids remaining. Another known method involves total removal of solvent by introducing the polycarbonate solution into boiling water and thus volatilizing off the solvent. A further prior art method involves the addition to the solution of an inert polycarbonate non-solvent that precipitates the solid polycarbonate which is later removed by filtration. These processes have attained little commercial success since they all have some inherent disadvantages. For example, during evaporation of the solutions, difficulties frequently arise where the polycarbonates adhere to the heat exchanger surfaces and thereby hinder the heat exchange. In the precipitation and hot water procedure usually very loose synthetic resin powders or flakes result which have an undesirably low bulk density. These low bulk density materials are unsuitable for further thermoplastic working up, such as by extrusion or injection molding. When using the above-noted non-solvent precipitation procedure, further problems are involved in total separation of the solvent from the non-solvent in the resulting solution.

While the most advantageous process for the production of solid polycarbonates from solution thereof seems to be the above-described gelling procedure, this process cannot be used in all cases especially when initial dilute polycarbonate solutions are used. For example, when using the continuous polycarbonate production process of U.S. patent application Ser. No. 115,934, the solutions obtained have a concentration of about 0.5% to about 25% and are not generally capable of gelling.

It is, therefore, an object of this invention to provide a process for the production of solid polycarbonates from solutions thereof which is devoid of the foregoing disadvantages. Another object of this invention is to provide a process for the removal of solid polycarbonate from solution thereof whereby the resulting product has a desirably high bulk density. Still another object of this invention is to provide a process for removing polycarbonates from solution whereby the resulting solid product may be easily further processed and handled. Yet another object of this invention is to provide a process for production of solid polycarbonates from a solution whereby even dilute polycarbonate solutions may be used. Still another object of this invention is to provide a process for production of solid polycarbonate having a high bulk density from solid polycarbonate having a low bulk density.

The foregoing objects and others are accomplished in accordance with this invention, generally speaking, by providing a process for the production of substantially solid polycarbonates from a solution thereof which comprises mixing with said dilute polycarbonate solution a low bulk density solid polycarbonate to form thereby a substantially solid crumbly mass. The concentrated solution and subsequent crumbly mass formed has a polycarbonate solids content of between from about 30% to about 90% by weight. This mass may be further processed after breaking up to remove the residual amounts of solvent. The amounts of low bulk density solid polycarbonate and polycarbonate solution which are mixed depend on the concentration of each; however, any amounts may be used which will result in a crumbly mass product. It has thus found that solid polycarbonate granulates with high bulk density can be obtained in a simple manner from dilute polycarbonate solutions with a polycarbonate content of between about 0.5 and about 25% by weight (hereinafter referred to as "dilute solution"). This is accomplished by a process in which so much solid polycarbonate with low bulk density (by low bulk density material is meant any polycarbonate having a bulk density of less than about 0.2 grams/cc.) is added to such a solution that a concentrated polycarbonate solution results with a content of solids between about 30 and about 90% by weight. This solution is allowed to stand in known manner until it has changed by recrystallization of the polycarbonate into a hard but crumbly mass. This mass is broken up and the volatile components are removed therefrom.

Surprisingly, the polycarbonate with low bulk density, preferably amounting to less than 0.2 gram/cc. dissolves so quickly in the dilute polycarbonate solution that a homogeneous concentrated solution is obtained in a few minutes which gels very rapidly. Thus, for example, in the production of a 60 to 70% solution of the polycarbonate from Bisphenol A, 2,2-(4,4'-dihydroxy diphenyl)-propane, by dissolving a powdery or flocculent polycarbonate from Bisphenol A with a bulk density of less than 0.2 gram/cc. in a 10% solution of this polycarbonate in methylene chloride, the total time required from the beginning of the dissolution to the solidification of the solution amounts to not more than about two to three minutes, so that the process according to the present invention can easily be carried out continuously.

A worm extrusion machine provided with kneading sections into which the dilute polycarbonate solution and the polycarbonate with low bulk density are continuously fed, is particularly suitable for the continuous carrying out of the process according to the present invention. It is thereby expedient to adjust the number of revolutions of the worm so that the average residence time of the mixture amounts to about 2 to 5 minutes. A polycarbonate granulate with high bulk density is continuously obtained which after leaving the machine, is freed from possibly adhering water and from solvent.

In an especially advantageous method of carrying out the process according to the present invention that part of the dilute polycarbonate solution obtained in the polycarbonate production is converted, by precipitation with a solvent which does not dissolve polycarbonates or preferably by introduction into boiling water, for example, according to the process of our copending patent application Ser. No. 297,681, filed July 25, 1963, concerned with a "Resin Recovery System" or of British Patent No. 422,192 into a loose mass with a low bulk density—a process which can possibly also be carried out continuously—the loose polycarbonate obtained is dissolved in the remainder of the dilute polycarbonate solution, the solution obtained brought to crystallization, the solid mass obtained broken up and the volatile components separated off. It is thereby of no influence on the process according to the present invention, especially on the velocity with which the dissolving and gelling occurs, whether the loose polycarbonate is mixed in a dried or moist state with the polycarbonate solution. Thus, for example, flocculent polycarbonate with a very high water content, such as of 50 to 400% by weight can be used. After the solidification of the polycarbonate solutions, this water can be separated off in a simple manner. There is obtained a solid polycarbonate granulate with a bulk density of about 0.3 to 0.4 gram/cc. which is outstandingly suitable for further working up by the known processes.

According to the process of the present invention, there can be worked up dilute solutions of those polycarbonates which can be produced, for example, according to the processes of the U.S. Patent 3,028,365 and the U.S. patent applications Ser. Nos. 572,802 (now U.S. Patent No. 3,136,741) and 572,793 (now U.S. Patent No. 3,271,367), possibly with the addition of chain breakers such as phenol, the cresols, p-isopropyl phenol, p-tert.-butyl phenol and p-chlorophenol from the following dihydroxy compounds or their mixtures;

hydroquinone,
resorcinol,
pyrocatechol,
4,4-dihydroxy-diphenyl,
2,2'-dihydroxy-diphenyl,
1,4-dihydroxy naphthalene,
1,6-dihydroxyl-naphthalene,
2,6-dihydroxy-naphthalene,
1,2-dihydroxy-naphthalene,
1,5-dihydroxy-naphthalene,
1,4-dihydroxy-quinoline,
2,2'-dihydroxy-naphthyl-1,1', o-, m- and p-hydroxy-benzyl alcohol,
(4,4'-dihydroxy-diphenyl)-methane,
2,2-(4,4'-dihydroxy-diphenyl)-propane,
1,1-(4,4'-dihydroxy-diphenyl)-cyclohexane,
1,1-(4,4'-dihydroxy-3,3'-dimethyl-diphenyl)-cyclohexane,
2,2-(2,2'-dihydroxy-4,4'-di-tert.-butyl-diphenyl)-propane,
3,4-(4,4'-dihydroxy-diphenyl)-hexane,
1,1-(4,4'-dihydroxy-diphenyl)-1-phenyl-ethane,
2,2-(4,4'-dihydroxy-diphenyl)-butane,
2,2-(4,4'-dihydroxy-diphenyl)-pentane,
3,3-(4,4'-dihydroxy-diphenyl)-pentane,
2,2-(4,4'-dihydroxy-diphenyl)-3-methyl butane,
2,2-(4,4'-dihydroxy-diphenyl)-hexane,
2,2-(4,4'-dihydroxy-diphenyl)-4-methyl-pentane,
2,2-(4,4'-dihydroxy-diphenyl)-heptane,
4,4-(4,4'-dihydroxy-diphenyl)-heptane,
2,2-(4,4'-dihydroxy-diphenyl)-tridecane,
4,4'-dihydroxy-diphenyl sulphone,
2,2'-dihydroxy-diphenyl sulphone,
3,3'-dihydroxy-diphenyl sulphone,
4,4'-dihydroxy-2,2'-dimethyl-diphenyl sulphone,
4,4'-dihydroxy-3,3'-dimethyl-diphenyl sulphone,
2,2'-dihydroxy-4,4'-dimethyl-diphenyl sulphone,
2,2'-dihydroxy-1,1'-dinaphthyl sulphone,
4,4'-dihydroxy-diphenyl ether,
4,4'-dihydroxy-2,2'-dimethyl-diphenyl ether,
4,4'-dihydroxy-3,3'-dimethyl-diphenyl ether,
4,4'-dihydroxy-diphenyl sulphide,
4,4'-dihydroxy-2,2'-dimethyl-diphenyl sulphide,
4,4'-dihydroxy-3,3'-dimethyl-diphenyl sulphide,
4,4'-dihydroxy-diphenyl sulphoxide,
4,4'-dihydroxy-2,2'-dimethyl-diphenyl sulphoxide,
4,4'-dihydroxy-3,3'-dimethyl-diphenyl sulphoxide,
ethylene glycol,
diethylene glycol,
triethylene glycol,
polyethylene glycol,
thiodiglycol,
ethylene dithiodiglycol,
propane-1,2-diol,
and the di- and poly-golycols produced from
propylene 1,2-oxide,
propane-1,3-diol,
butane-1,3-diol,
butane-1,4-diol,
2-methyl-propane-1,3-diol,
pentane-1,5-diol,
2-ethyl-propane-1,
3-diol,
hexane-1,6-diol,
octane-1,8-diol,
2-ethyl-hexane-1,3-diol,
decane-1,10-diol,
quinite,
cyclohexane-1,2-diol,
o-, m- and p-xylylene glycol,
2,2-(4,4'-dihydroxy-dicyclohexyl)-propane and
2,6-dihydroxy-decahydro-naphthalene.

As inert solvents for the polycarbonates there may be used all solvents from which the polycarbonates are capable of crystallizing, such as, methylene chloride, chloroform, ethylene chloride, tetrahydrofuran, dioxane, tetrachloroethane, chlorobenzene, trichloroethane, dichloroethane, thiophene, benzene, toluene and xylene or mixtures thereof.

The following examples are given for the purpose of illustrating the present invention; parts and percentages are by weight unless otherwise specified.

*Example 1*

By the reaction of 4,4'-dihydroxy-diphenyl-2,2-propane with phosgene in the presence of aqueous sodium hydroxide and methylene chloride (as described in U.S. Patent 3,028,365) there is produced an 8.7% solution of a polycarbonate with a relative viscosity of 1.3 (measured in about 0.5% solution in methylene chloride).

In about 100 parts by weight of this solution there are dissolved in a kneader, about 82.6 parts by weight of a flocculent, dried polycarbonate with a bulk density of about 0.05 grams/cc. obtained by the introduction of part of the above polycarbonate solution into boiling water in the device according to British patent specification No. 422,192. After about five minutes, the solution obtained has changed into a solid, crumbly mass which is subsequently broken up, freed from the solvent by boiling with water and dried. There is obtained a polycarbonate granulate with a bulk density of about 0.35 gram cc.

*Example 2*

By the reaction of a mixture of about 91% by weight 4,4'-dihydroxy-diphenyl-2,2-propane and about 9% by weight 4,4'-dihydroxy-diphenyl-1,1-cyclohexane with phosgene in the presence of aqueous sodium hydroxide and methylene chloride, there is produced about 9.1% solution of a polycarbonate with a relative viscosity of about 1.32 (measured in about 0.5% solution in methylene chloride).

In about 100 parts by weight of this solution there are dissolved about 845 parts by weight of a flocculent, moist polycarbonate with a water content of about 223% by weight, referred to the dry polycarbonate, produced as stated in Example 1. After about 2½ minutes, the solution solidifies to a solid crumbly mass which is separated from the separated water and subsequently worked up as stated in Example 1. The bulk density of the polycarbonate granulate obtained amounts to about 0.36 gram/cc.

*Example 3*

Into a worm extrusion machine equipped with two shafts and provided with kneading sections, there are fed hourly about 100 parts by weight of the 8.7% polycarbonate solution described in Example 1 and about 900 parts by weight of the flocculent, moist polycarbonate with a water content of about 220% by weight, referred to the dry polycarbonate, produced as stated in Example 1. The number of revolutions of the worm is thereby so adjusted that an average residence time of the mixture in the worm extruder of about five minutes is attained.

There is thus continuously obtained a mixture of solvent-containing solid polycarbonate granulate and water which is continuously freed from water in a centrifuge. The polycarbonate granulate is subsequently freed from the solvent and still adherent water by drying. The bulk density of the polycarbonate granulate obtained amounts to about 0.38 gram/cc.

*Example 4*

In about 100 parts by weight of the 8.7% polycarbonate solution described in Example 1, there are dissolved in a kneader, about 845 parts by weight of a powdery polycarbonate with a water content of about 234% by weight, referred to the dry polycarbonate, obtained by evaporation of a polycarbonate solution with boiling water and steam according to the process of our copending application concerning with a "Resin Recovery System." After about two minutes, the solution obtained has changed into a solid, crumbly mass which is separated from the water and dried. A polycarbonate granulate with a bulk density of about 0.4 gram/cc. is obtained.

It is to be understood that this invention is not limited by the examples, but that any of the compositions mentioned above as typical for use in the present invention may be used in place of those set forth in the examples with similar results.

Although the invention has been described in considerable detail in the foregoing, it is to be understood that such detail is solely for the purpose of illustration and that many variations can be made by those skilled in the art without departing from the spirit and scope of the invention except as set forth in the claims.

What is claimed is:

1. A process for the production of substantially solid polycarbonate having a high bulk density which comprises mixing a solid polycarbonate having a bulk density up to about 0.2 gram/cc. with a dilute solution of polycarbonate substantially free of non-solvent and having a polycarbonate concentration of up to about 25% to convert said dilute solution into a concentrated solution having a polycarbonate concentration of at least about 30% by weight, allowing said concentrated solution to stand until it forms a substantially solid, crumbly mass, and thereafter removing the remaining liquid components therefrom.

2. The process of claim 1 wherein said concentrated polycarbonate solution has a polycarbonate concentration of from about 30% to about 90%.

3. The process of claim 1 wherein said polycarbonate having a bulk density up to about 0.2 gram/cc. is obtained by a process which comprises contacting a dilute polycarbonate solution with a polycarbonate non-solvent thereby precipitating said low bulk density polycarbonate.

4. The process of claim 1 wherein said solid, crumbly mass is broken up continuously in a worm extrusion machine.

5. The process of claim 1 wherein said polycarbonate is made from 2,2-(4,4'-dihydroxy diphenyl)-propane.

References Cited
UNITED STATES PATENTS

| | | | |
|---|---|---|---|
| 2,989,503 | 6/1961 | Jibben | 260—47 X |
| 3,065,204 | 11/1962 | Dietrich et al. | 260—47 X |
| 3,112,292 | 11/1963 | Bottenbruch et al. | 260—47 X |

FOREIGN PATENTS

| | | |
|---|---|---|
| 897,201 | 5/1962 | Great Britain. |

SAMUEL H. BLECH, *Primary Examiner.*